United States Patent
Shimada et al.

(10) Patent No.: US 7,441,332 B2
(45) Date of Patent: Oct. 28, 2008

(54) METHOD FOR RESTORING PERFORMANCE CAPABILITIES OF EXHAUST GAS TREATMENT APPARATUS

(75) Inventors: Hiroshi Shimada, Hiroshima (JP); Yousuke Oka, Hiroshima (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 165 days.

(21) Appl. No.: 10/582,402

(22) PCT Filed: Dec. 11, 2003

(86) PCT No.: PCT/JP03/15867

§ 371 (c)(1),
(2), (4) Date: Jun. 12, 2006

(87) PCT Pub. No.: WO2005/056165

PCT Pub. Date: Jun. 23, 2005

(65) Prior Publication Data

US 2007/0119053 A1 May 31, 2007

(51) Int. Cl.
*B21D 51/16* (2006.01)
*B23P 6/00* (2006.01)
*F01N 3/08* (2006.01)
*B01D 50/00* (2006.01)

(52) U.S. Cl. ............... 29/890; 29/402.01; 29/402.03; 29/402.09; 29/402.11; 29/890.031; 422/176; 422/177; 422/178; 428/593

(58) Field of Classification Search ............. 29/81.01, 29/81.02, 402.01, 402.03–402.06, 402.09, 29/402.11, 890, 890.031, 890.08; 422/176–178, 422/180; 428/593, 596; 55/282; 95/278
See application file for complete search history.

(56) References Cited

U.S. PATENT DOCUMENTS

| | | | |
|---|---|---|---|
| 4,869,738 A * | 9/1989 | Alcorn et al. ............ 422/177 |
| 4,976,941 A | 12/1990 | Tsunoda et al. |
| 6,565,630 B2 * | 5/2003 | Ohno et al. ............. 95/278 |
| 6,908,498 B2 * | 6/2005 | Ament et al. ........... 95/278 |
| 7,241,329 B2 * | 7/2007 | Weber .................... 95/278 |
| 2002/0076372 A1 * | 6/2002 | Leloup et al. ........... 422/222 |
| 2002/0141910 A1 * | 10/2002 | Adiletta ................. 422/171 |
| 2007/0006438 A1 * | 1/2007 | Loiola ................. 29/402.03 |

FOREIGN PATENT DOCUMENTS

EP 1 211 392 A1 6/2002
JP 59-49849 A 3/1984

(Continued)

*Primary Examiner*—David P. Bryant
*Assistant Examiner*—Alexander P Taousakis
(74) *Attorney, Agent, or Firm*—Sughrue Mion, PLLC

(57) ABSTRACT

To provide a method for recovering performance of a discharge gas processing apparatus, the method being capable of recovering $NO_x$ removal performance of a deteriorated $NO_x$ removal catalyst without replacing the deteriorated $NO_x$ removal catalyst with a new catalyst and without adding a new catalyst.

After a honeycomb catalyst 1 having gas conduits for feeding a gas to be treated has been placed and used in a discharge gas conduit of a discharge gas processing apparatus 10, the honeycomb catalyst 1 is rearranged such that a portion of the honeycomb catalyst 1—the portion being on the upstream side in terms of the flow of the gas to be treated and extending to cover a predetermined range is transferred from the inlet side of the discharge gas conduit.

18 Claims, 10 Drawing Sheets

FOREIGN PATENT DOCUMENTS

| | | |
|---|---|---|
| JP | 61-15740 A | 1/1986 |
| JP | 64-80444 A | 3/1989 |
| JP | 1-119343 A | 5/1989 |
| JP | 4-197451 A | 7/1992 |
| JP | 7-80330 | 3/1995 |
| JP | 7-116523 A | 5/1995 |
| JP | 7-222924 A | 8/1995 |
| JP | 8-196920 A | 8/1996 |
| JP | 11-179153 A | 7/1999 |
| JP | 2000-325801 A | 11/2000 |
| JP | 2004-041989 A | 2/2004 |
| WO | WO2004104382 * | 2/2004 |

* cited by examiner

Sustained turbulent flow distance and catalyst stain distance

Sustained turbulent flow distance (mm)

METHOD FOR RESTORING PERFORMANCE CAPABILITIES OF EXHAUST GAS TREATMENT APPARATUS

TECHNICAL FIELD

The present invention relates to a method for recovering performance of an exhaust gas processing apparatus employing a honeycomb-form catalyst (hereinafter referred to simply as honeycomb catalyst) for use in treatment of automobile exhaust gas, purification of gas, chemical synthesis, etc.; particularly for use in removal of $NO_x$ from flue gas produced by a facility such as a thermal power station.

BACKGROUND ART

Conventionally, boilers provided in thermal power stations and a variety of large-scale boilers employing a fuel such as petroleum, coal, or fuel gas, waste incinerators, and similar apparatuses have been equipped with a flue gas $NO_x$ removal apparatus for treating exhaust gas which apparatus includes a plurality of $NO_x$ removal catalyst layers.

The $NO_x$ removal catalyst is generally composed of a carrier (e.g., $TiO_2$), an active component (e.g., $V_2O_5$), and a co-catalyst component (e.g., tungsten oxide or molybdenum oxide), and multi-component oxide $NO_x$ removal catalysts such as $VO_x$—$WO_y$—$TiO_2$ and $VO_x$—$MoO_y$—$TiO_2$ are employed.

The $NO_x$ removal catalysts typically assume the form of honeycomb, plate, etc. Honeycomb catalysts include a coated catalyst, which is fabricated by producing a honeycomb substrate and coating the substrate with a catalyst component; a kneaded catalyst, which is fabricated by kneading a substrate material with a catalyst component and molding into a honeycomb catalyst; and an impregnated catalyst, which is fabricated by impregnating a honeycomb substrate with a catalyst component. Plate-form catalyst are fabricated by coating a metallic substrate or a ceramic substrate with a catalyst component.

In any case, during use, the catalytic performance of the above catalysts is problematically deteriorated with elapse of time as a result of deposition, on the surface of the catalysts, of a substance which deteriorates the catalytic performance (hereinafter referred to as deteriorating substance) or through migration of the dissolved deteriorating substance into the catalysts.

In this connection, a variety of methods for regenerating an $NO_x$ removal catalyst have conventionally been studied.

For example, there have been studied some methods including physically removing a deteriorated portion and foreign matter so as to expose a catalytically active surface; e.g., a method including abrasion of an inner surface of a discharge gas conduit by use of an abrasive (see, for example, Patent Document 1); a method including scraping a deteriorated surface portion of an $NO_x$ removal catalyst to thereby expose a catalytically active new surface (see, for example, Patent Document 2); and a method including causing a gas accompanying microparticles to flow through a through-hole to thereby remove foreign matter (see, for example, Patent Document 3).

In addition, there have been studied catalytic performance regeneration methods through washing; e.g., a method including washing a deteriorated catalyst with an acid ($pH \leq 5$) or an alkali ($pH \geq 8$) (see, for example, Patent Document 4); a method including washing a deteriorated catalyst sequentially with water or a dilute aqueous inorganic acid solution, with a 0.1 to 5 wt. % aqueous oxalic acid solution, and with water to remove oxalic acid residing on the catalyst (see, for example, Patent Document 5); and a method including washing a deteriorated catalyst with water (50° C. to 80° C.), followed by drying (see, for example, Patent Document 6).

However, methods based on physical abrasion or a similar technique have drawbacks in that operation is cumbersome and that an $NO_x$ removal catalyst itself is cracked or broken during a regeneration process.

Generally, in the case of washing an $NO_x$ removal catalyst, an alkaline component is removed through washing with an aqueous alkaline solution, hot water, etc., and heavy metal components predominantly containing vanadium are effectively removed through washing with an aqueous oxalic acid solution. However, even though these washing-based approach are employed, washing out the deteriorating substances would be insufficient. Thus, washing-based regeneration methods employing a variety of cleaning components have been studied.

There has also been proposed an apparatus for regenerating deteriorated catalyst performance without removing the catalyst (see Patent Document 7). The approach for regenerating catalyst performance, employing an additional apparatus, incurs high operational cost, which is problematic.

As described above, a variety of regeneration methods have been studied. However, these methods have some drawbacks, and no satisfactory methods have been developed.

[Patent Document 1]
Japanese Patent Application Laid-Open (kokai) No. 1-119343 Claims and other sections)

[Patent Document 2]
Japanese Patent Application Laid-Open (kokai) No. 4-197451

[Patent Document 3]
Japanese Patent Application Laid-Open (kokai) No. 7-116523

[Patent Document 4]
Japanese Patent Application Laid-Open (kokai) No. 64-80444

[Patent Document 5]
Japanese Patent Application Laid-Open (kokai) No. 7-222924

[Patent Document 6]
Japanese Patent Application Laid-Open (kokai) No. 8-196920

[Patent Document 7]
Japanese Patent Application Laid-Open (kokai) No. 2000-325801

DISCLOSURE OF THE INVENTION

Under the aforementioned circumstances, an object of the present invention is to provide a method for recovering performance of a discharge gas processing apparatus, the method being capable of recovering $NO_x$ removal performance of a deteriorated $NO_x$ removal catalyst at low cost without replacing the deteriorated $NO_x$ removal catalyst with a new catalyst and without adding a new catalyst.

Accordingly, a first mode of the present invention for attaining the aforementioned object provides a method for recovering performance of a discharge gas processing apparatus, which apparatus includes a honeycomb catalyst having gas conduits for feeding a gas to be treated, the catalyst being provided in a discharge gas conduit of the apparatus and, in use, performing gas treatment on the sidewalls of the gas conduits, characterized in that the method comprises rearranging the honeycomb catalyst such that a deteriorated portion of the honeycomb catalyst is transferred from the inlet side of the discharge gas conduit, wherein the deteriorated portion is on the upstream side in terms of the flow of the gas to be treated and extends to cover a predetermined range of the honeycomb catalyst.

According to the first mode, the honeycomb catalyst is rearranged such that the deteriorated portion of the honeycomb catalyst is transferred from the inlet side of the discharge gas conduit. Thus, the state of the portion effectively involved in $NO_x$ removal can be renewed, whereby $NO_x$ removal performance can be recovered.

A second mode of the present invention is drawn to a specific embodiment of the method for recovering performance of a discharge gas processing apparatus according to the first mode, wherein the honeycomb catalyst is rearranged such that the deteriorated portion is disposed on the downstream side in terms of the flow of the gas so that the gas feed direction is inverted.

According to the second mode, the honeycomb catalyst is rearranged in the discharge gas processing apparatus such that the deteriorated portion is disposed on the downstream side. Through inverting the honeycomb catalyst with respect to the gas flow direction, $NO_x$ removal performance can be readily recovered.

A third mode of the present invention is drawn to a specific embodiment of the method for recovering performance of a discharge gas processing apparatus according to the first or second mode, wherein the honeycomb catalyst is cut perpendicular to the gas flow direction into a plurality of catalyst pieces, and the catalyst pieces are rearranged such that the deteriorated portion is not disposed on at least the furthest upstream side.

According to the third mode, the honeycomb catalyst is rearranged in discharge gas processing apparatus by cutting the honeycomb catalyst perpendicular to the gas flow direction into a plurality of catalyst pieces and rearranging the catalyst pieces such that a catalyst piece containing the deteriorated portion is not disposed on at least the furthest upstream side. Through changing the combination mode of the cut honeycomb catalyst pieces, $NO_x$ removal performance can be reliably recovered.

A fourth mode of the present invention is drawn to a specific embodiment of the method for recovering performance of a discharge gas processing apparatus according to any of the first to third modes, wherein the honeycomb catalyst is rearranged after the deteriorated portion has been removed.

According to the fourth mode, the deteriorated portion is removed upon rearrangement of the honeycomb catalyst in the discharge gas processing apparatus. Thus, deteriorated $NO_x$ removal performance can be recovered readily and reliably.

A fifth mode of the present invention is drawn to a specific embodiment of the method for recovering performance of a discharge gas processing apparatus according to any of the first to third modes, wherein a portion of the sidewalls of the gas conduits of the honeycomb catalyst is removed through abrasion, the portion covering the deteriorated portion, and then the honeycomb catalyst is rearranged.

According to the fifth mode, upon rearrangement of the honeycomb catalyst in the discharge gas processing apparatus, the deteriorated portions on the sidewalls of the gas conduits are removed through abrasion. Through employment of the procedure, only predetermined portions are removed through abrasion, and removal rate can be reduced as compared with the case in which the entirety of the honeycomb catalyst is polished. Therefore, damage to the $NO_x$ removal catalyst can be mitigated.

A sixth mode of the present invention is drawn to a specific embodiment of the method for recovering performance of a discharge gas processing apparatus according to any of claims 1 to 5, wherein the predetermined range corresponds to a range from the inlet to a site where the flow of the gas fed into the gas conduits is regulated and straightened.

According to the sixth mode, performance of the honeycomb catalyst can be recovered in a portion extending from the inlet thereof to a site where the flow of the gas fed into the gas conduits is regulated and straightened. Thus, $NO_x$ removal performance of the portions of the sidewalls of the gas conduits where the gas to be treated is not effectively brought into contact can be reliably recovered.

A seventh mode of the present invention is drawn to a specific embodiment of the method for recovering performance of a discharge gas processing apparatus according to the first to sixth modes, wherein the range Lb (mm) is represented by equation (A):

$$Lb = a(Ly/Lys \cdot 22e^{0.035(Ly \cdot Uin)}) \quad (A)$$

(wherein Uin (m/s) represents a gas inflow rate, Ly (mm) represents an aperture size, Lys is an aperture size of 6 mm (constant value), and "a" is a constant falling within a range of 3 to 5, when the aperture size (Ly) is 6 mm and the gas inflow rate is 6 m/s).

According to the seventh mode, the deteriorated portion of the honeycomb catalyst can be reliably and precisely specified, whereby performance of the discharge gas treatment apparatus can be fully recovered.

An eighth mode of the present invention is drawn to a specific embodiment of the method for recovering performance of a discharge gas processing apparatus according to any of the first to seventh modes, wherein the honeycomb catalyst is a flue gas $NO_x$ removal catalyst.

According to the eighth mode, the honeycomb catalyst can be employed as a flue gas $NO_x$ removal catalyst.

A ninth mode of the present invention is drawn to a specific embodiment of the method for recovering performance of a discharge gas processing apparatus according to the eighth mode, wherein the honeycomb catalyst is immersed at ambient temperature in regeneration water containing substantially no chlorine and no cleaning component, the catalyst is retransferred from the regeneration water, and residual water is retransferred from the catalyst.

According to the ninth mode, inhibitors deteriorating $NO_x$ removal performance can be readily eluted and removed by merely immersing the $NO_x$ removal catalyst at substantially ambient temperature in regeneration water. Thus, $NO_x$ removal performance can be restored.

The present invention is applicable to any type of conventionally employed honeycomb catalyst. The term "honeycomb catalyst" refers to a catalyst unit including gas conduits having a cross-section of a polygon such as square, hexagonal, or triangular, and performing catalytic reaction on the sidewalls of the gas conduits. No particular limitation is imposed on the form of the honeycomb catalyst, and typical forms include a cylinder containing gas conduits each having a hexagonal cross-section, and a rectangular prism containing gas conduits each having a square cross-section and arranged in a lattice-like form.

In such a honeycomb catalyst, when a gas is fed into the honeycomb lattice, the following behavior is conceived. Specifically, the gas forms turbulent flow at the inlet thereof, whereby collision between reactive substance and sidewalls of the gas conduits (catalyst walls) is promoted. On the other hand, in the course of passage of the gas through the honeycomb lattice, the turbulent flow is gradually straightened and converted into laminar flow, whereby collision between reactive substance and sidewalls of the gas conduits is suppressed. Eventually, the gas flow is in a general diffusion-controlled state.

In other words, the following mechanism is conceived. When a honeycomb $NO_x$ removal catalyst has been continuously used for a long period of time, the catalyst surface is covered with a substance such as coal ash. In this state, $NH_3$ (ammonia) and $NO_x$, which are reactive substances, cannot approach the catalyst, and adsorption of ammonia, which determines the reaction rate, onto the catalyst is inhibited, resulting in deterioration of the catalyst performance. On the basis of the conceived mechanism, the surface of the used catalyst has been investigated along the longitudinal direction, and the inventors have found that a portion of the catalyst on the inlet side is thickly covered with the substance, the performance of the portion is considerably deteriorated, and that such covering is not observed in a portion of the catalyst on the outlet side, and the portion is virtually uninvolved in $NO_x$ removal reaction. The present invention has been accomplished on the basis of these findings. Briefly, the inventors have found that deterioration of the catalyst is localized in a portion of the catalyst in the inlet side, and that catalyst performance depends on the conditions of the portion of the inlet side. The present invention has been accomplished on the basis of these findings.

The present invention has been accomplished on the basis of the findings that deterioration of the honeycomb catalyst occurs in a predetermined range corresponding to a range from the inlet to a site where the flow of the discharge gas fed into the gas conduits is regulated and straightened, and that the portion on the downstream side with respect to the range is virtually uninvolved in $NO_x$ removal reaction. The present inventors have also found that the range Lb (mm) is represented by equation (A):

$$Lb = a(Ly/Lys \cdot 22 e^{0.035(Ly \cdot Uin)})  \quad (A)$$

(wherein Uins (m/s) represents a gas inflow rate, Ly (mm) represents an aperture size, Lys is an aperture size of 6 mm (constant value), and "a" is a constant falling within a range of 3 to 5, when the aperture size (Ly) is 6 mm and the gas inflow rate is 6 m/s). The details of this finding will be described hereinbelow.

Accordingly, the present invention is applicable to any honeycomb catalyst having a length of the aforementioned predetermined range or wider, preferably of at least about double the range calculated by the above equation. According to the present invention, performance of such a honeycomb catalyst which has been used in $NO_x$ removal and deteriorated can be recovered without replacing the deteriorated $NO_x$ removal catalyst with a new catalyst and without adding a new catalyst, whereby the performance of the discharge gas processing apparatus can be recovered.

In the method of the present invention, the point in time for recovering the performance of a catalyst may be assessed periodically at appropriate times during a service period of the $NO_x$ removal catalyst. In an actual state, deterioration of a plurality of $NO_x$ removal catalyst layers occurs non-uniformly, and order of deterioration, the start of deterioration, etc. in respective layers differ depending on the conditions of use. Thus, the deterioration statuses of respective $NO_x$ catalyst layers are assessed with high precision, and the aforementioned performance recovery is preferably performed only when the performance of a catalyst is deteriorated below a predetermined level.

For example, preferably, $NO_x$ concentrations and $NH_3$ concentrations on the inlet and outlet sides of respective $NO_x$ removal catalyst layers are determined; percent $NO_x$ removal ($\eta$) is determined on the basis of an inlet mole ratio (i.e., inlet $NH_3$/inlet $NO_x$); and performance of respective $NO_x$ removal catalyst layers is evaluated on the basis of the percent $NO_x$ removal ($\eta$). According to the above method, $NO_x$ concentrations and $NH_3$ concentrations are determined on the inlet and outlet sides of respective $NO_x$ removal catalyst layers, and the percent $NO_x$ removal ($\eta$) is determined on the basis of an inlet mole ratio. Therefore, percent $NO_x$ removal, which is enhanced as the mole ratio increases, can be evaluated accurately and on an absolute basis.

In this case, the percent $NO_x$ removal ($\eta$) of respective $NO_x$ removal catalyst layers may be determined on the basis of $NO_x$ concentrations. However, the percent $NO_x$ removal ($\eta$) is preferably determined on the basis of $NH_3$ concentrations rather than on the basis of $NO_x$ concentrations, since the catalytic performance can be assessed with smaller variation.

In order to even more correctly assess the deterioration status of the catalysts, a portion of the target $NO_x$ removal catalyst may be sampled, and the sampled catalyst may be evaluated in terms of catalytic performance.

As mentioned above, in the honeycomb catalyst to be treated in the present invention, the mode of catalytic reaction varies in accordance with the shape of the catalyst. Thus, the present invention can be applied to not only $NO_x$ removal catalysts of a discharge gas processing apparatus or a similar apparatus, but also to any catalysts having a structure in which a reactive fluid passes through the inside of a honeycomb section. The invention may be applied when the reactive fluid contains a substance which inhibits catalytic reaction.

As described hereinabove, the present invention provides a method for recovering performance of a discharge gas processing apparatus, which method is capable of recovering $NO_x$ removal performance of a deteriorated $NO_x$ removal catalyst through moving a portion of a used $NO_x$ removal catalyst from the inlet side of the discharge gas conduit, wherein the portion extends to cover a predetermined range of the honeycomb catalyst from the gas inlet. Thus, performance of the discharge gas processing apparatus can be maintained at low cost without replacing the deteriorated $NO_x$ removal catalyst with a new catalyst and without adding a new catalyst.

BEST MODES FOR CARRYING OUT THE INVENTION

Best modes for carrying out the invention will next be described with reference to the drawings. The description of the present embodiment is provided only for the purpose of illustration, and should not be construed as limiting the invention thereto. The present embodiment is the case in which a honeycomb catalyst is employed as an $NO_x$ removal catalyst used in a discharge gas processing apparatus. Needless to say, the present invention is not limited to such use.

As mentioned above, the method of the present invention for recovering performance of a discharge gas processing apparatus has been accomplished on the basis of the finding that deterioration of the honeycomb catalyst is observed mainly in a portion of a predetermined range from the inlet of the catalyst and the other portion is virtually undeteriorated. Accordingly, the honeycomb catalyst is rearranged such that the deteriorated portion of the honeycomb catalyst is transferred from the inlet side of the discharge gas conduit.

Figure 1:
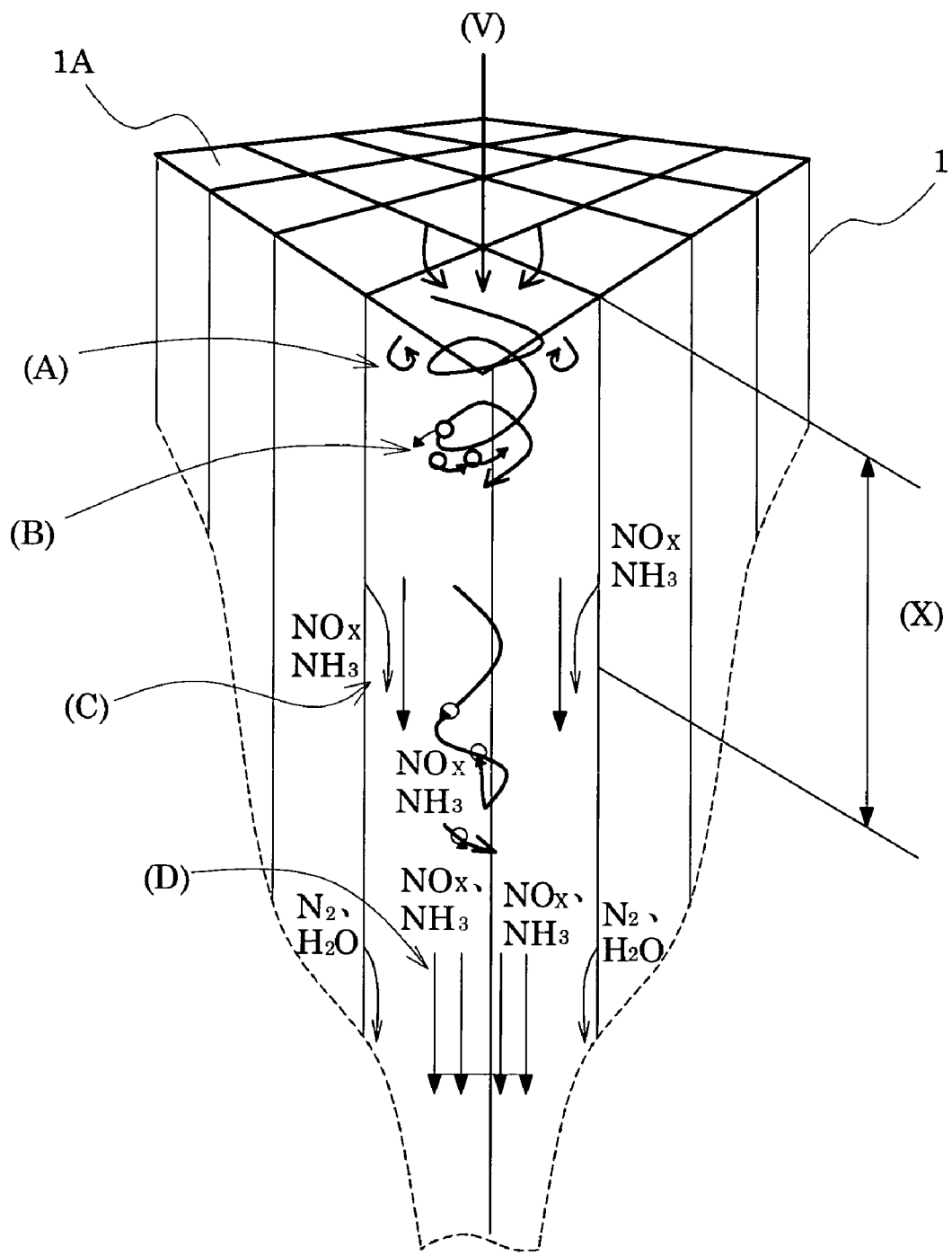
FIG. 1 is a sketch showing gas flow in a honeycomb catalyst.

The flow of discharge gas passing through gas conduits of a honeycomb catalyst will next be described with reference to the drawing. FIG. 1 is a sketch showing flow of a discharge gas passing through a honeycomb catalyst, as obtained through simulation. In FIG. 1, a honeycomb catalyst 1 has a plurality of gas conduits 1A penetrating a generally rectangular prism structure in the longitudinal direction and having dimensions of 600 mm×6 mm×6 mm. The gas conduits 1a are arranged at a pitch of 7 mm, and the aperture size is 6 mm.

When the discharge gas flows from the wide outer space into the inside of the gas conduits 1A of the honeycomb catalyst 1, space ratio is reduced from 1 to, for example, 0.64. In the course of passage through the gas conduits 1A, the discharge gas is caused to be contact with inner walls (catalyst walls) of the conduits with considerable turbulence. In other words, the discharge gas which has entered the gas conduits 1A forms turbulent flow through friction with catalyst walls (see (A) in FIG. 1), and coal ash, and $NH_3$ or $NO_x$, serving as reactive substance, contained in the discharge gas also passes through the gas conduits with collision against the catalyst walls (see (B) in FIG. 1).

In the course of passage through gas conduits 1A, the discharge gas is gradually regulated and straightened, and the number of $NH_3$ molecules or $NO_x$ molecules which collide against the inner walls decreases considerably (see (C) in FIG. 1). In addition, most molecules of $NH_3$ or $NO_x$ pass through the gas conduits 1A virtually without contact with the inner walls (see (D) in FIG. 1). In other words, after the discharge gas has been regulated and straightened, virtually no $NO_x$ removal reaction occurs.

Turbulence features of gas flow in a typical honeycomb catalyst vary depending upon gas flow rate ((V) in FIG. 1) and aperture size of gas conduits of the honeycomb catalyst.

In the case of the honeycomb catalyst 1 shown in FIG. 1 having gas conduits 1A disposed at a pitch of about 7 mm (aperture size: 6 mm), a portion ranging from the gas inlet to a depth of about 300 mm provides a turbulent flow region ((X) in FIG. 1), and the inner walls present in the region are considerably involved in $NO_x$ removal reaction.

On the basis of the simulation results, the following relationship can be deduced regarding the aforementioned turbulent flow region. The simulation was carried out with respect to a honeycomb catalyst having a plurality of gas conduits 1A penetrating a generally rectangular prism structure in the longitudinal direction and having dimensions of 600 mm×6 mm×6 mm, with a pitch of gas conduits 1a of 7 mm and a honeycomb aperture size of 6 mm. The gas temperature was 350° C. In the description hereinafter, the term "sustained turbulent flow distance" refers to the distance from the inlet to a site where turbulent flow energy is lost in the course of transition from turbulent flow to laminar flow.

In the simulation, sustained turbulent flow distance (Lts) values at fluid inflow rates (Uin) of 4, 6, and 10 m/s were calculated as 50, 80, and 180 mm, respectively.

Theoretically, conditions of fluid are generally determined from inflow rate (Uin) and Reynolds number Re; i.e., a parameter employing aperture size Ly (Re=Uin·Ly/v, v=5.67×10$^{-5}$ m$^2$/S; constant).

Figure 2:
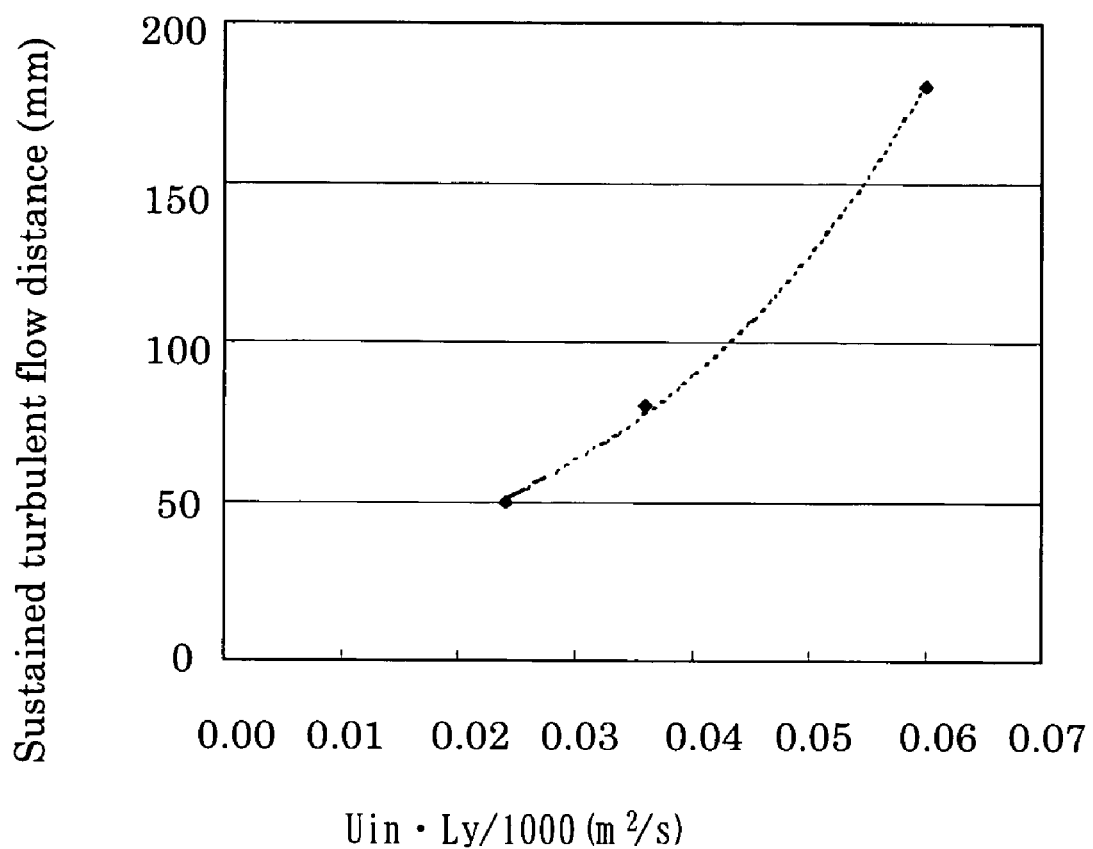
FIG. 2 is a graph showing the relationship between sustained turbulent flow distance and Uin·Ly obtained through simulation.

Accordingly, in a honeycomb catalyst having an aperture size of 6 mm, sustained turbulent flow distance Lts (mm) is derived from a product of inflow rate Uins (m/s) and aperture size Lys (mm). Thus, the relationship between sustained turbulent flow distance Lts and a product of inflow rate Uins (Uin) and aperture size Lys (Ly), as shown in FIG. 2, is obtained. Through the least squares method, sustained turbulent flow distance Lts at an aperture size (Lys) of 6 mm is approximately represented by the following equation (1).

$$Lts = 22 e^{0.035(Lys \cdot Uins)} \quad (1)$$

When the aperture size Lys is 6 mm (constant value), the aperture size Ly (mm) is an arbitrary parameter, and Uin (m/s) represents a gas inflow rate, sustained turbulent flow distance Lt can be represented by the following formula (2), which is a general equation.

$$Lt = Ly/Lys \cdot 22 e^{0.035(Ly \cdot Uin)} \quad (2)$$

Figure 3:
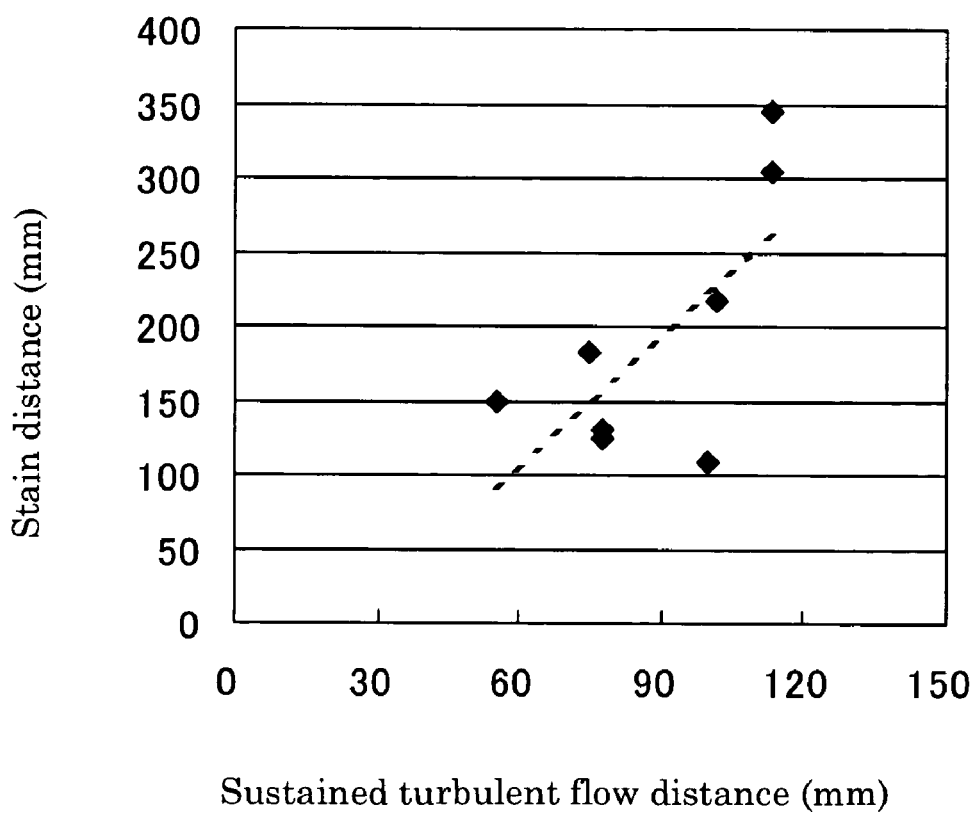
FIG. 3 is a graph showing the relationship between sustained turbulent flow distance and stained portion distance as observed in an actual apparatus.

The simulation results were compared with the length of a deteriorated portion of the actual catalyst. Specifically, the relationship between sustained turbulent flow distance Lt and the length of a stained portion of the catalyst (stain length), which is an index for evaluating a deteriorating portion) was investigated. As shown in FIG. 3, in an actual stage of the employed apparatus, turbulent flow is conceived to be maintained over a portion of the catalyst having a distance longer than the sustained turbulent flow distance Lt, which is derived through simulation. One possible reason of this phenomenon is that inflow rate is varied and flow of the fluid is disturbed.

In an actual catalyst unit, the distance from the inlet to a site where straightening starts (i.e., the length of the deteriorated portion) must be determined by multiplying equation (2) by a constant "a," and the length Lb of the deteriorated portion is considered to be represented by the following equation (3). Note that "a" is a constant falling within a range of 3 to 5, when the aperture size of a honeycomb catalyst is 6 mm (pitch: 7 mm) and the gas inflow rate is 6 m/s.

$$Lb = a \cdot Lt \quad (3)$$

In the aforementioned embodiment, a honeycomb catalyst having an aperture size of 6 mm (pitch: 7 mm) was used at a gas inflow rate of 6 m/s. Thus, Lt is 80 mm. When the constant "a" is adjusted to about 3.8, Lt is about 300 mm, which corresponds to the length of an actually deteriorated portion of the catalyst.

As described above, the present embodiment is based on the fact that the predetermined range from the inlet to a site where the discharge gas flow is regulated and straightened in the honeycomb catalyst 1 (i.e., a portion of the catalyst ranging from the inlet of the gas conduits 1A to a depth of about 300 mm) is considerably involved in $NO_x$ removal reaction. Thus, the honeycomb catalyst, after use, is rearranged such that the portion of the catalyst ranging from the inlet to a depth of 300 mm (hereinafter referred to as deteriorated portion) is transferred from the inlet side of the discharge gas conduit of the discharge gas processing apparatus, whereby performance of the discharge gas processing apparatus is recovered. As used herein, "rearrangement of the honeycomb catalyst such that the deteriorated portion is transferred from the inlet side of the discharge gas conduit" means that the deteriorated portion is retransferred from the inlet side and a portion which has undergone no substantial deterioration is disposed on the inlet side. Specifically, conceivable modes of the rearrangement are as follows.

In a first mode of rearrangement, a honeycomb catalyst is rearranged such that the deteriorated portion is disposed on the downstream side in terms of the flow of the gas so that the gas feed direction is inverted. This mode will be described with reference to FIG. 4.

Figure 4:
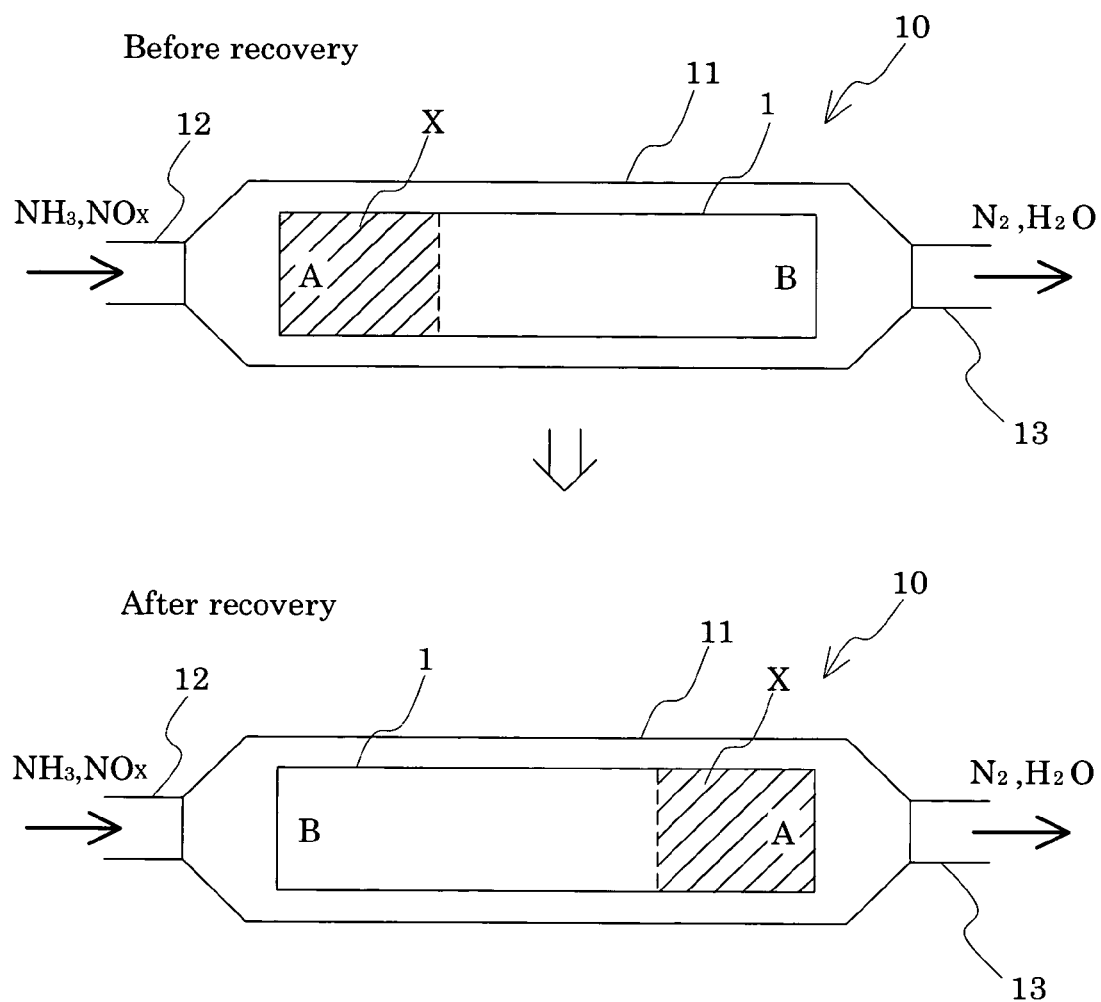
FIG. 4 is a sketch showing an embodiment of performance recovery treatment of a catalyst according to the present invention.

As shown in FIG. 4, a discharge gas processing apparatus 10 has a honeycomb catalyst 1 in an apparatus body 11, and process gas introduction piping 12 is connected to one side of the apparatus body 11 and gas discharge piping 13 is connected to the other side of the apparatus body. In FIG. 4, a portion A of the honeycomb catalyst 1 is disposed on the inlet side, and a portion B thereof is disposed on the outlet side. A predetermined range of the portion A is considered to be a deteriorated portion X. The honeycomb catalyst 1 is rearranged such that the deteriorated portion is disposed on the downstream side in terms of the flow of the gas (hereinafter the rearrangement may be referred to as inverted rearrangement) so that the gas feed direction is inverted. In inverted rearrangement, the portion B is disposed on the inlet side, and the portion A is disposed on the outlet side. Through this rearrangement, discharge gas is treated with the portion B, which has undergone no substantial deterioration and is disposed on the inlet side, whereby catalyst performance is remarkably recovered.

In the above mode, the honeycomb catalyst 1 may be inverted in the apparatus body 11. Alternatively, the process gas introduction piping 12 connected to the portion A side and the gas discharge piping 13 connected to the portion B side may be interchanged with each other so as to invert the direction of the flow of process gas. Needless to say, the effects of the two manners are equivalent.

In a second mode of rearrangement, a honeycomb catalyst is cut perpendicular to the gas flow direction into a plurality of catalyst pieces, and the catalyst pieces are rearranged such that the deteriorated portion is not disposed on at least the furthest upstream side.

Figure 5:
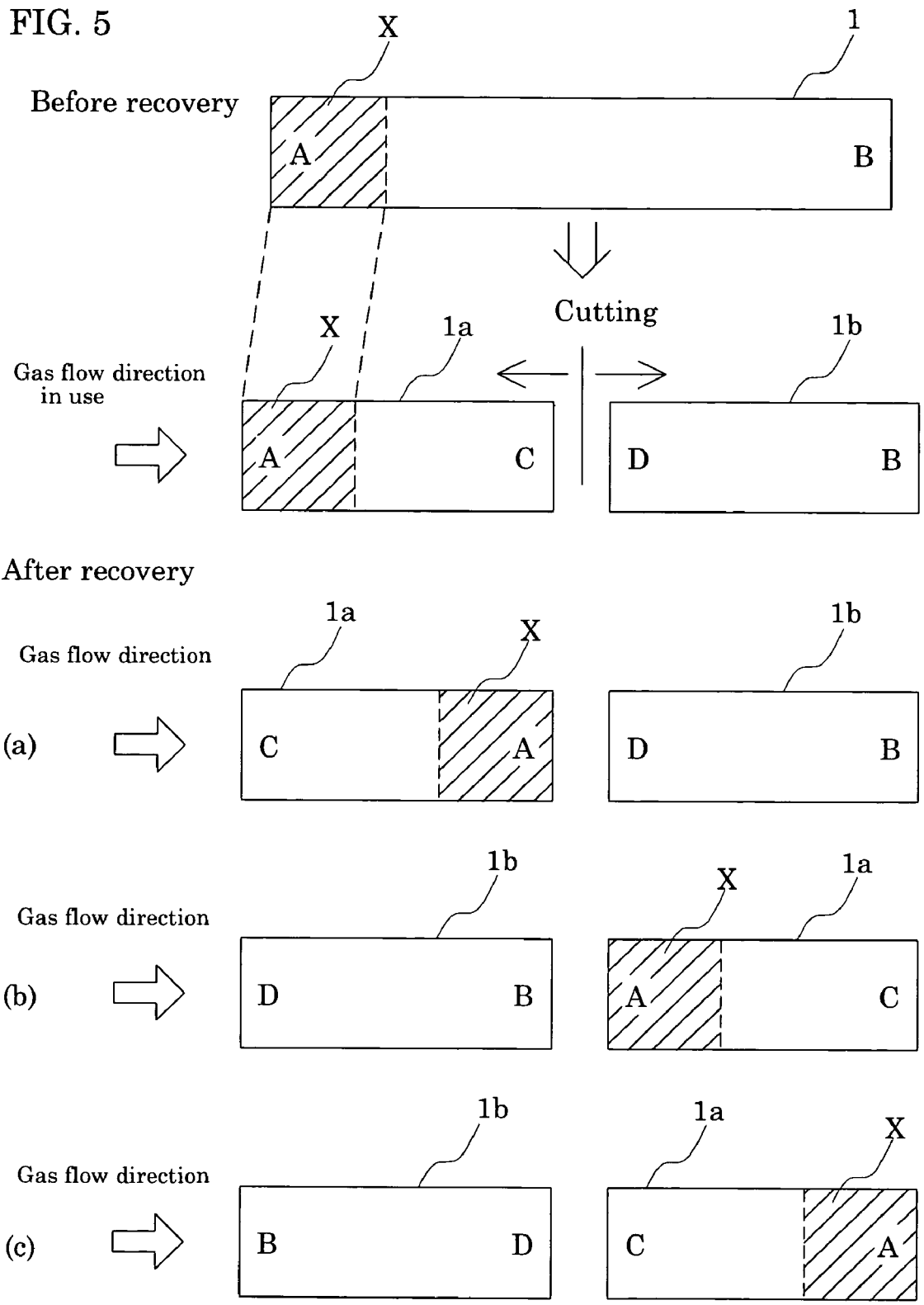
FIG. 5 is a sketch showing an embodiment of combination of cut catalyst pieces according to the present invention.

Specifically, in FIG. 5, a portion A is disposed on the inlet side, and a portion B is disposed on the outlet side. A predetermined range of the portion A is considered to be a deteriorated portion X. In the second mode, the honeycomb catalyst 1 is cut into catalyst piece halves 1a and 1b, and the catalyst pieces are arranged such that the deteriorated portion X is not disposed on the inlet side. In other words, as in FIG. 5(a), it may be the case that only the catalyst piece half 1a containing the deteriorated portion X is inverted so as to dispose a portion C on the inlet side. Alternatively, as in FIG. 5(b) or 5(c), the catalyst piece half 1b on the outlet side may be moved so as to be disposed on the inlet side. Needless to say, various other manners of rearrangement may be employed.

Notably, when cut catalyst pieces are rearranged, catalyst piece halves 1a and 1b may be disposed with or without spacing. Since the process gas is conceived to form turbulent flow on the inlet side of the catalyst piece half 1a or 1b disposed on the downstream side, the inlet of the catalyst piece half may be considerably involved in discharge gas processing, whereby discharge gas processing performance can be enhanced as compared with the performance before recovery. Thus, although the deteriorated portion X may be disposed on the inlet side of the catalyst piece half 1a on the downstream side as shown in FIG. 5(b), an undeteriorated portion is preferably disposed on the inlet side of a catalyst piece on the downstream side as shown in FIG. 5(a) or (c).

The honeycomb catalyst 1 may be cut into three or more pieces, and the pieces may be rearranged. The effect of the second mode may be attained, when the catalyst is cut into pieces having a predetermined length equal to or longer than that of the deteriorated portion X. In the case where the catalyst is cut into pieces having a length longer than that of the deteriorated portion X, the length is preferably double the length of the deteriorated portion X. In this case, inverted rearrangement may also be performed for reuse.

In a third mode, the honeycomb catalyst is rearranged after a deteriorated portion has been removed.

Figure 6:
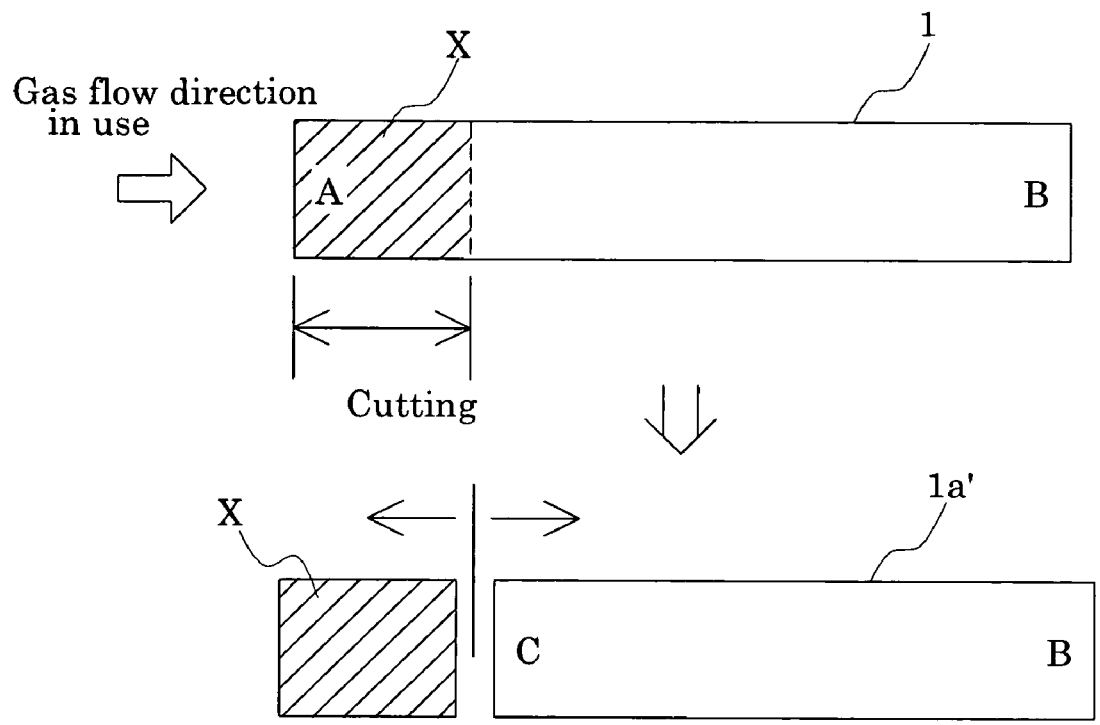
FIG. 6 is a sketch showing an embodiment of removal of a catalyst by cutting according to the present invention.

Specifically, in FIG. 6, a portion A is disposed on the inlet side, and a portion B is disposed on the outlet side. A predetermined range of the portion A is considered to be a deteriorated portion X. In the third mode, at least the deteriorated portion X is retransferred from the honeycomb catalyst 1, to thereby form a catalyst 1c, and the catalyst 1c is used in a non-inverted or inverted state. In this case, the length of the catalyst 1c is shortened through removal of the deteriorated portion. However, discharge gas processing performance is completely maintained, since the performance is generally determined on the basis of a predetermined range of the portion on the inlet side. Accordingly, when the new catalyst has been further deteriorated, the deteriorated portion may be removed through cutting.

In a fourth mode, a portion of the sidewalls of gas conduits of a honeycomb catalyst is removed through abrasion, the portion covering a deteriorated portion, and then the honeycomb catalyst is rearranged.

Figure 7:
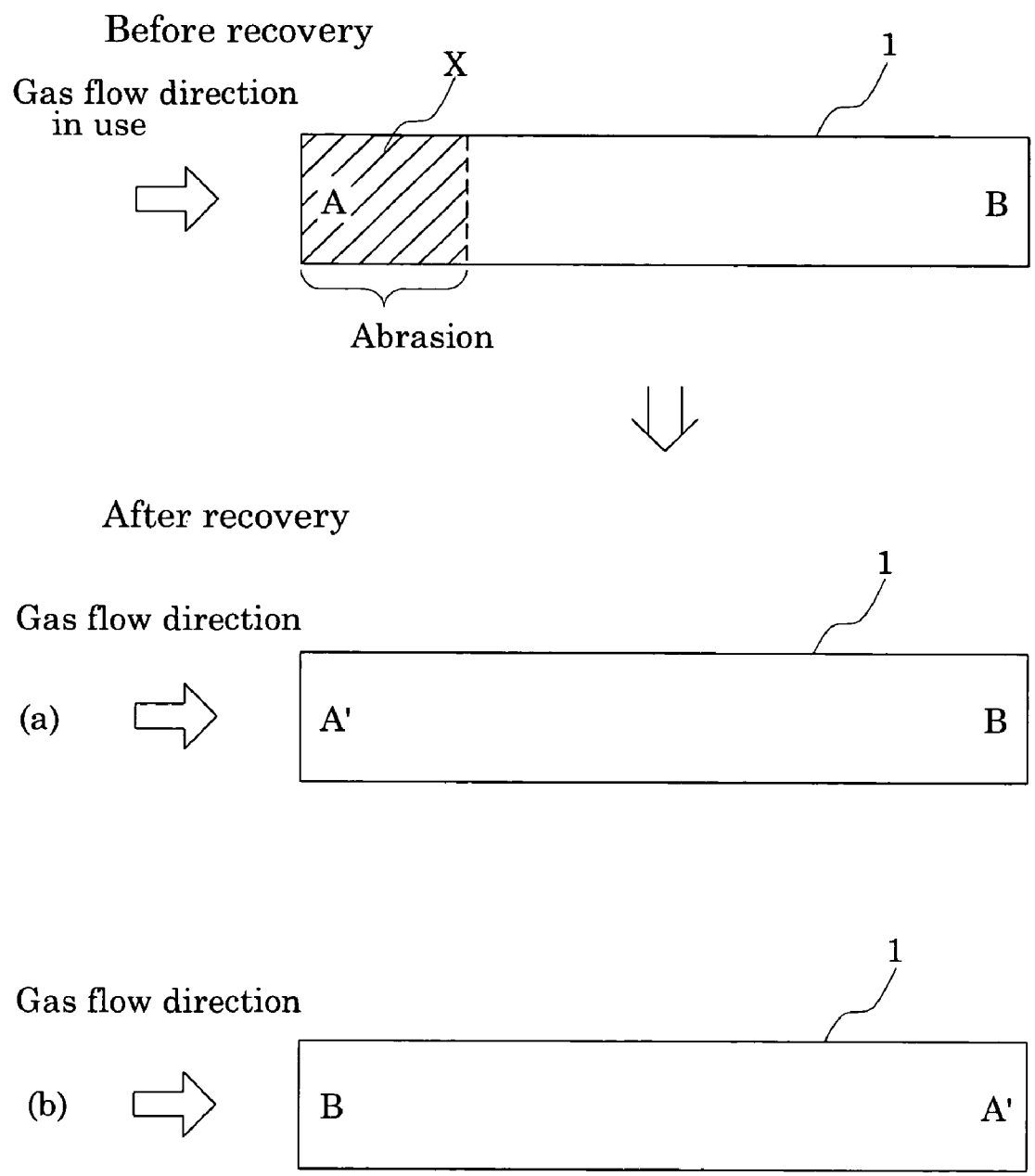
FIG. 7 is a sketch showing an embodiment of catalyst performance recovery treatment on the basis of abrasion according to the present invention.

Specifically, in FIG. 7, a portion A is disposed on the inlet side, and a portion B is disposed on the outlet side. A predetermined range of the portion A is considered to be a deteriorated portion X. In the fourth mode, only the deteriorated portion X is recovered through, for example, shot-blasting of abrasives onto the portion, and the thus-recovered catalyst 1 is rearranged. Either a rearrangement manner shown in FIG. 7(a) or that shown in 7(b) may be employed. However, needless to say, inverted rearrangement shown in FIG. 7(b) is more potent for sufficient performance recovery. In the fourth mode, a conventionally known abrasion treatment may be carried out. Conventionally, the gas conduits of the honeycomb catalyst 1 are subjected to abrasion over the entire length in the longitudinal direction. However, according to the present invention, only the deteriorated portion X is subjected to abrasion, and the treatment can be readily performed.

The method of the present invention may further include washing of a honeycomb catalyst. Specifically, in the aforementioned first mode, the honeycomb catalyst 1 may be inverted after washing of the catalyst. In the second mode, after cutting, the catalyst piece 1a containing a deteriorated portion X may be washed and reused. In the fourth mode, washing may be carried out before or after abrasion. Preferably, washing is performed after abrasion.

No particular limitation is imposed on the washing procedure. In the case where an $NO_x$ removal catalyst, particularly an $NO_x$ removal catalyst which has been employed in a flue gas $NO_x$ removal apparatus of a boiler employing coal as a fuel, is washed, preferably, the catalyst is immersed at ambient temperature in regeneration water containing substantially no chlorine and no cleaning component, the catalyst is retransferred from the regeneration water, and residual water is retransferred from the catalyst. For example, the catalyst may be immersed in regeneration water until bubbling stops. Briefly, the catalytic performance of such a catalyst can be sufficiently recovered through merely immersing the catalyst in pure water at ambient temperature, and used regeneration water can be repeatedly used. In addition, since the regeneration water contains no heavy metal species, water treatment can be performed in a relatively simple manner. Thus, the washing treatment is advantageous.

When the method of the present invention is applied to a discharge gas processing apparatus in which a plurality of stages of honeycomb catalyst layers are disposed along the gas flow direction, the recovery treatment can be applied to a honeycomb catalyst of each stage. Although the recovery treatment may be performed with respect to all honeycomb catalyst stages, it may be the case that only a deteriorated honeycomb catalyst stage is recovery-treated, after the deterioration status of each stage has been checked.

EMBODIMENT

Taking as an example a flue gas $NO_x$ removal apparatus provided in a thermal power station, the discharge gas processing apparatus to which the method of the present invention is applied will be described. However, the discharge gas processing apparatus to which the embodiment can be applied is not limited to the flue gas $NO_x$ removal apparatus.

Figure 8:
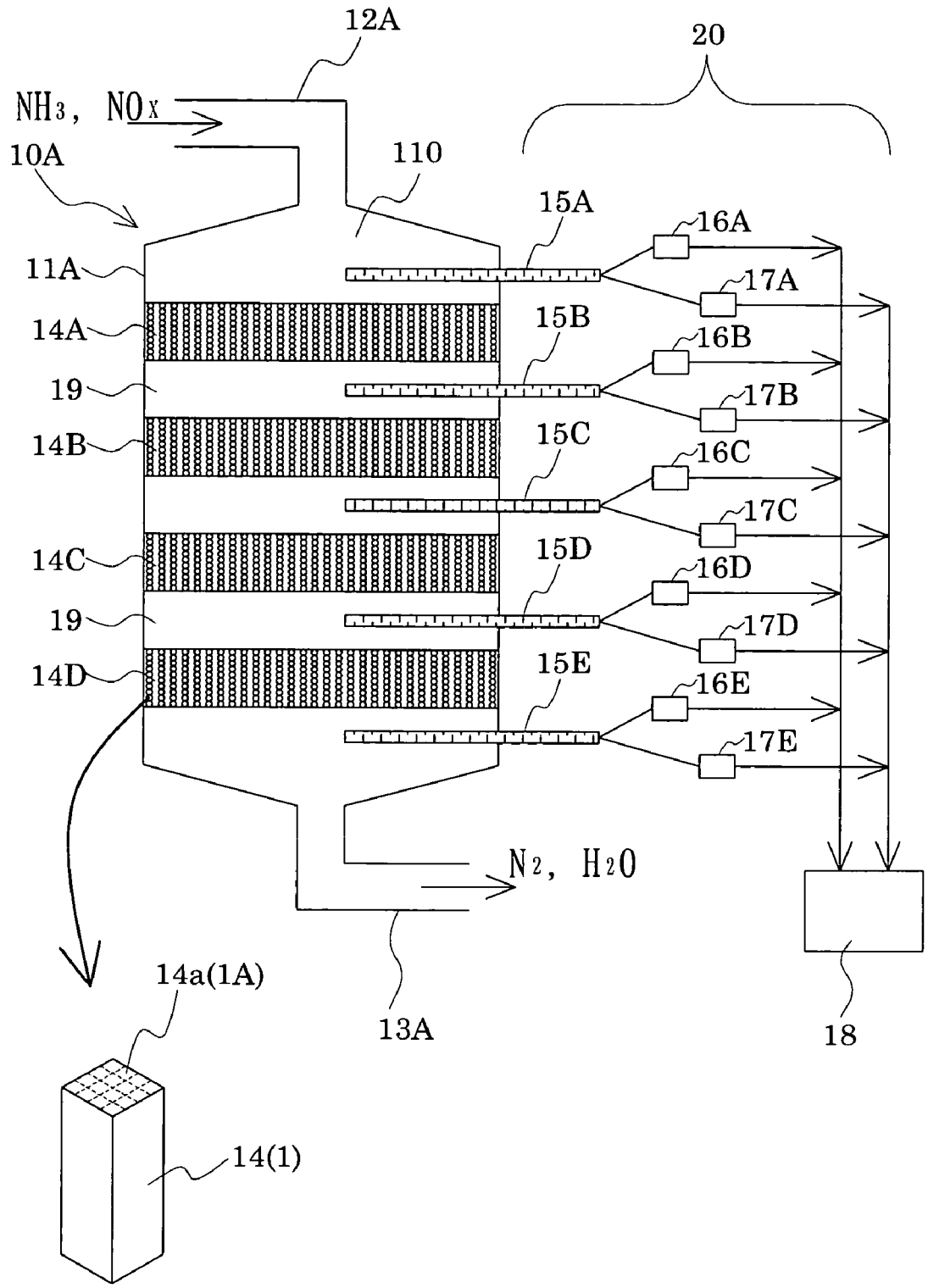
FIG. 8 is a schematic view showing a configuration of a discharge gas processing apparatus employing an $NO_x$ removal catalyst to which the method of the present invention is applied.

As shown in FIG. 8, a discharge gas $NO_x$ removal apparatus 10A includes a process gas introduction piping 12A and a treated gas piping 13A. The process gas introduction piping 12A is in communication with a boiler unit installed in a thermal power station that is connected with an apparatus body 11A on the upstream side. The treated gas piping 13A is connected with the apparatus body 11A on the downstream side. In the apparatus body 11A having a discharge gas conduit 110, a plurality of $NO_x$ removal catalyst layers (4 layers in this embodiment) 14A to 14D are disposed at predetermined intervals. The $NO_x$ removal catalyst layers 14A to 14D are arranged so that a discharge gas introduced through the process gas introduction piping 12A is sequentially passed therethrough, and reduce the level of nitrogen oxide ($NO_x$) of the discharge gas through contact with the discharge gas passing through the catalyst layers. Notably, to the process gas introduction piping 12A communicating with the boiler unit, $NH_3$ is injected in an amount in accordance with the amount of the discharge gas fed from the boiler body.

No particular limitation is imposed on the type, shape, etc. of the $NO_x$ removal catalyst layers 14A to 14D. Generally, each catalyst is composed of $TiO_2$ serving as a carrier and $V_2O_5$ serving as an active component. In this embodiment, honeycomb catalysts were employed.

In the present embodiment, each catalyst layer employs a catalyst in the form of columnar honeycomb having a plurality of gas conduits 14a penetrating a generally rectangular-column structure along the longitudinal direction, and a plurality of honeycomb catalysts are juxtaposed in combination, thereby forming the catalyst layers 14A to 14D. Each $NO_x$ removal catalyst 14 has a length of 860 mm and includes a plurality of gas conduits 14a arranged at a pitch of 7 mm. Each catalyst 14 corresponds to a honeycomb catalyst 1 shown in FIG. 1.

The interlayer spacing between two adjacent $NO_x$ removal catalyst layers 14A to 14D is about 2,000 mm, which corresponds to the height for allowing a person to perform inspection or sampling of a catalyst. Each interlayer space serves as a common gas conduit 19.

An $NO_x$ removal catalyst management unit 20 is provided with gas sampling means 15A through 15E on the inlet and outlet sides of respective $NO_x$ removal catalyst layers 14A through 14D. The gas sampling means 15A through 15E are connected with $NO_x$ concentration measurement means 16A through 16E and with $NH_3$ concentration measurement means 17A through 17E. The data obtained by the measurement means are transferred to a percent $NO_x$ removal determination means 18 for calculating percent $NO_x$ removal and percent $NO_x$ removal contribution of the respective $NO_x$ removal catalyst layers 14A through 14D.

The gas sampling means 15A through 15E sample, via sampling tubes, a gas to be sampled in a desired amount and at a desired timing, and subsequently feed the sampled gas to the $NO_x$ concentration measurement means 16A through 16E and to the $NH_3$ concentration measurement means 17A through 17E.

No particular limitation is imposed on the timing for sampling a gas by the gas sampling means 15A through 15E. Generally, sampling is carried out during usual operation of the power station, preferably at the nominal load where the amount of gas reaches the maximum, if possible. The interval between sampling operations may be prolonged to about six months, and the interval is sufficient for managing the performance of the $NO_x$ removal catalyst layers 14A through 14D. However, if the interval is shortened, precision in management is enhanced. Thus, the sampling is preferably carried out, for example, once every one to two months. Particularly, in a catalyst layer placed on the downstream side, variation of obtained data increases due to decrease in $NH_3$ concentration. Thus, in order to attain better management and evaluation, preferably, determination of $NH_3$ concentration is performed at short intervals, and percent $NO_x$ removal is calculated from an averaged $NH_3$ concentration value.

The percent $NO_x$ removal determination means 18 collects the measurement data from the $NO_x$ concentration measurement means 16A through 16E and the $NH_3$ concentration measurement means 17A through 17E, and calculates, from the measurement data, percent $NO_x$ removal and percent $NO_x$ removal contribution of respective $NO_x$ removal catalyst layers 14A through 14D.

On the basis of an inlet mole ratio (i.e., inlet $NH_3$/inlet $NO_x$) of the $NO_x$ removal catalyst layers 14A through 14D, the $NH_3$-concentration-based percent $NO_x$ removal ($\eta$) is determined from the following equation (4):

$$\eta = \{(\text{inlet } NH_3 - \text{outlet } NH_3)/(\text{inlet } NH_3 - \text{outlet } NH_3 + \text{outlet } NO_x)\} \times 100 \times (\text{evaluation mole ratio/inlet mole ratio}) \quad (4).$$

As used herein, the term "evaluation mole ratio" refers to a mole ratio which is predetermined for the purpose of evaluating an $NO_x$ removal catalyst. The evaluation mole ratio may be predetermined to an arbitrary value; for example, 0.8, which is almost equal to a mole ratio typically employed for operating a power station.

In the above discharge gas processing apparatus 10A, a deteriorated catalyst layer among the four $NO_x$ removal catalyst layers 14A to 14D can be correctly determined. Thus, the aforementioned recovery treatment can be performed with respect to deteriorated catalyst layer(s) among the four $NO_x$ removal catalyst layers 14A to 14D.

Performance tests were carried out by means of a performance test machine. In accordance with the limitation of the test machine on the size of the catalyst sample (i.e., maximum length of 600 mm), the $NO_x$ removal catalysts to be tested were cut into 600 mm pieces.

COMPARATIVE TEST EXAMPLE

An $NO_x$ removal catalyst (entire length: 860 mm) which had been deteriorated during use in a flue gas $NO_x$ removal apparatus (having a structure equivalent to that of the discharge gas processing apparatus shown in FIG. 8) provided in an actual thermal power station was employed. A portion (length: 600 mm in the gas flow direction) was cut from the inlet side of the each $NO_x$ removal catalyst layer (i.e., comparative test piece), and set in a performance test machine in the same direction. The test gas was fed at a mole ratio (i.e., inlet mole ratio=inlet $NH_3$/inlet $NO_x$) of 0.54, 0.72, 0.87, or 0.98 and a flow rate of 6 m/s, and percent $NO_x$ removal ($\eta$) was determined on the basis of the aforementioned formula (4) employing $NH_3$ concentration. The "comparative test piece" corresponds to the honeycomb catalyst 1 before performance recovery as shown in FIG. 4. That is, the comparative test piece had not been subjected to any performance recovery treatment.

Test Example 1

An $NO_x$ removal catalyst (entire length: 860 mm) which had been deteriorated during use in a flue gas $NO_x$ removal apparatus (having a structure equivalent to that of the discharge gas processing apparatus shown in FIG. 8) provided in an actual thermal power station was employed. A portion (length: 600 mm in the gas flow direction) was cut from the outlet side of the each $NO_x$ removal catalyst layer (i.e., test piece 1), and set in a performance test machine in the inverted direction. The test gas was fed at a mole ratio (i.e., inlet mole ratio=inlet $NH_3$/inlet $NO_x$) of 0.57, 0.73, 0.87, or 0.98, and percent $NO_x$ removal ($\eta$) was determined on the basis of the aforementioned formula (4) employing $NH_3$ concentration. The set "test piece 1" corresponds to the honeycomb catalyst 1 after performance recovery as shown in FIG. 4.

Test Example 2

An $NO_x$ removal catalyst (entire length: 860 mm) which had been deteriorated during use in a flue gas $NO_x$ removal apparatus (having a structure equivalent to that of the discharge gas processing apparatus shown in FIG. 8) provided in an actual thermal power station was employed. A portion (length: 600 mm in the gas flow direction) was cut from the outlet side of the each $NO_x$ removal catalyst layer (i.e., test piece 2), and set in a performance test machine in the same direction. The test gas was fed at a mole ratio (i.e., inlet mole ratio=inlet $NH_3$/inlet $NO_x$) of 0.54, 0.73, 0.87, or 0.97, and percent $NO_x$ removal ($\eta$) was determined on the basis of the aforementioned formula (4) employing $NH_3$ concentration. The set "test piece 2" corresponds to the honeycomb catalyst 1c after performance recovery as shown in FIG. 6. That is, the test piece 2 corresponds to the honeycomb catalyst 1c from which a deteriorated portion has been removed and which has been rearranged in the same direction.

Test Example 3

In a manner similar to that of Test Example 1, a portion (length: 600 mm in the gas flow direction) was cut from the outlet side of the each $NO_x$ removal catalyst layer (i.e., test piece 3), and set in a performance test machine in the inverted direction. The test gas was fed at a mole ratio (i.e., inlet mole ratio=inlet $NH_3$/inlet $NO_x$) of 0.54, 0.72, 0.89, or 0.99, and percent $NO_x$ removal ($\eta$) was determined on the basis of the aforementioned formula (4) employing $NH_3$ concentration. Conditions other than washing and mole ratios are completely same as those employed in Test Example 1. The "test piece 3" is different from the test piece 1 in terms of performance of washing.

The test results of Test Examples 1 to 3 and Comparative Test Example are shown in Table 1. In addition to the comparative samples, a new catalyst product was tested as a reference sample. The test gas was fed at a mole ratio (i.e., inlet mole ratio=inlet $NH_3$/inlet $NO_x$) of 0.56, 0.76, 0.94, or 1.12, and the measurement was performed in a range from 100 mm to 500 mm with intervals of 100 mm. Percent $NO_x$ removal ($\eta$) was determined at respective mole ratios through the least squares method with extrapolation. The results are also shown in Table 1.

As is clear from Table 1, $NO_x$ removal catalysts tested in Test Examples 1 to 3, which had undergone performance recovery treatment, exhibited more recovered percent $NO_x$ removal, as compared with $NO_x$ removal catalysts tested in Comparative Test Example, which had undergone no performance recovery treatment. The $NO_x$ removal catalysts tested in Test Example 3 were found to exhibit a percent $NO_x$ removal almost recovered to that of a new catalyst product.

TABLE 1

| Catalysts tested | Mole ratio | Percent $NO_x$ removal |
|---|---|---|
| New product | 0.56 | 48.3% |
| | 0.76 | 61.4% |
| | 0.94 | 68.8% |
| | 1.12 | 70.7% |
| Comparative Test Example | 0.54 | 30.9% |
| | 0.72 | 38.9% |
| | 0.87 | 42.5% |
| | 0.98 | 43.5% |
| Test Example 1 | 0.57 | 38.9% |
| | 0.73 | 49.3% |
| | 0.87 | 53.9% |
| | 0.98 | 54.8% |
| Test Example 2 | 0.54 | 40.8% |
| | 0.73 | 52.3% |
| | 0.87 | 57.7% |
| | 0.97 | 58.6% |
| Test Example 3 | 0.54 | 46.1% |
| | 0.72 | 58.7% |
| | 0.89 | 65.7% |
| | 0.99 | 66.9% |

Test Example 4

Figure 9:
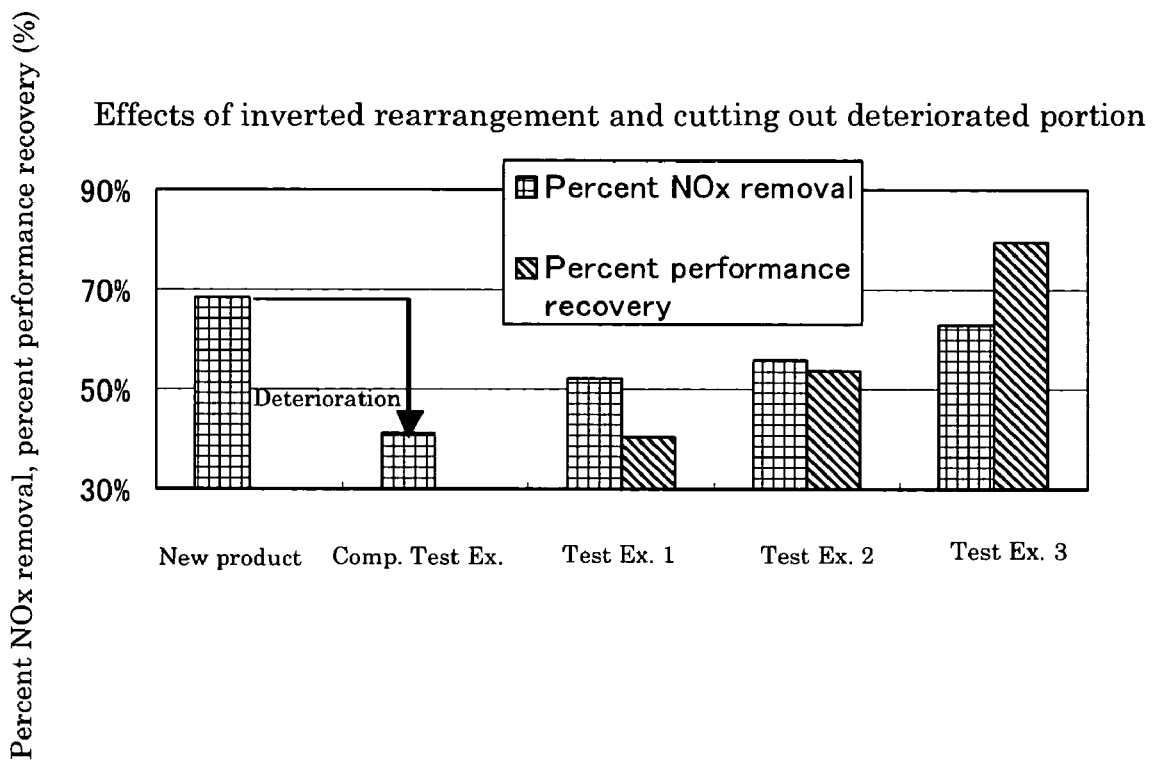
FIG. 9 is a graph showing the results of Test Example 4 of the present invention.

Percent $NO_x$ removal of the new catalyst product and $NO_x$ removal catalysts of Comparative Test Example and Test Examples 1 to 3 were determined under the following conditions: gas flow rate in honeycomb structure of 6 m/s at 360° C., catalyst length (test piece length) of 600 mm, SV: 9,900 L/h, AV: 23.3 $m^3N/m^2$, mole ratio of 0.82, and gas temperature of 360° C. Percent performance recovery was calculated from the obtained percent $NO_x$ removal in accordance with the following equation (5). Table 2 and FIG. 9 show the results.

Similar to Test Example 3, percent performance recovery of the new catalyst product was calculated through extrapolation. In addition to the 600 mm test piece of the new product, percent performance recovery of a 500 mm test piece thereof was calculated.

Percent performance recovery (%)=[(percent $NO_x$ removal of recovered catalyst)–(percent $NO_x$ removal of used (deteriorated) catalyst)]/[(percent $NO_x$ removal of new catalyst product)–(percent $NO_x$ removal of used (deteriorated) catalyst)]     (5)

The catalyst piece of Test Example 3 having a length of 600 mm in the gas flow direction, which was cut from the outlet side of the $NO_x$ removal catalyst, washed, and set in a performance test machine in the inverted direction, was found to exhibit excellent percent performance recovery.

TABLE 2

| Mole ratio = 0.82 | Percent $NO_x$ removal | Percent performance recovery |
|---|---|---|
| New product (length = 500) | 63.9% | |
| New product (length = 600) | 68.3% | |
| Comp. Test Example (length = 600) | 41.4% | |
| Test Example 1 (length = 600) | 52.3% | 40% |
| Test Example 2 (length = 600) | 55.9% | 54% |
| Test Example 3 (length = 600) | 62.8% | 80% |

Test Example 5

Figure 10:
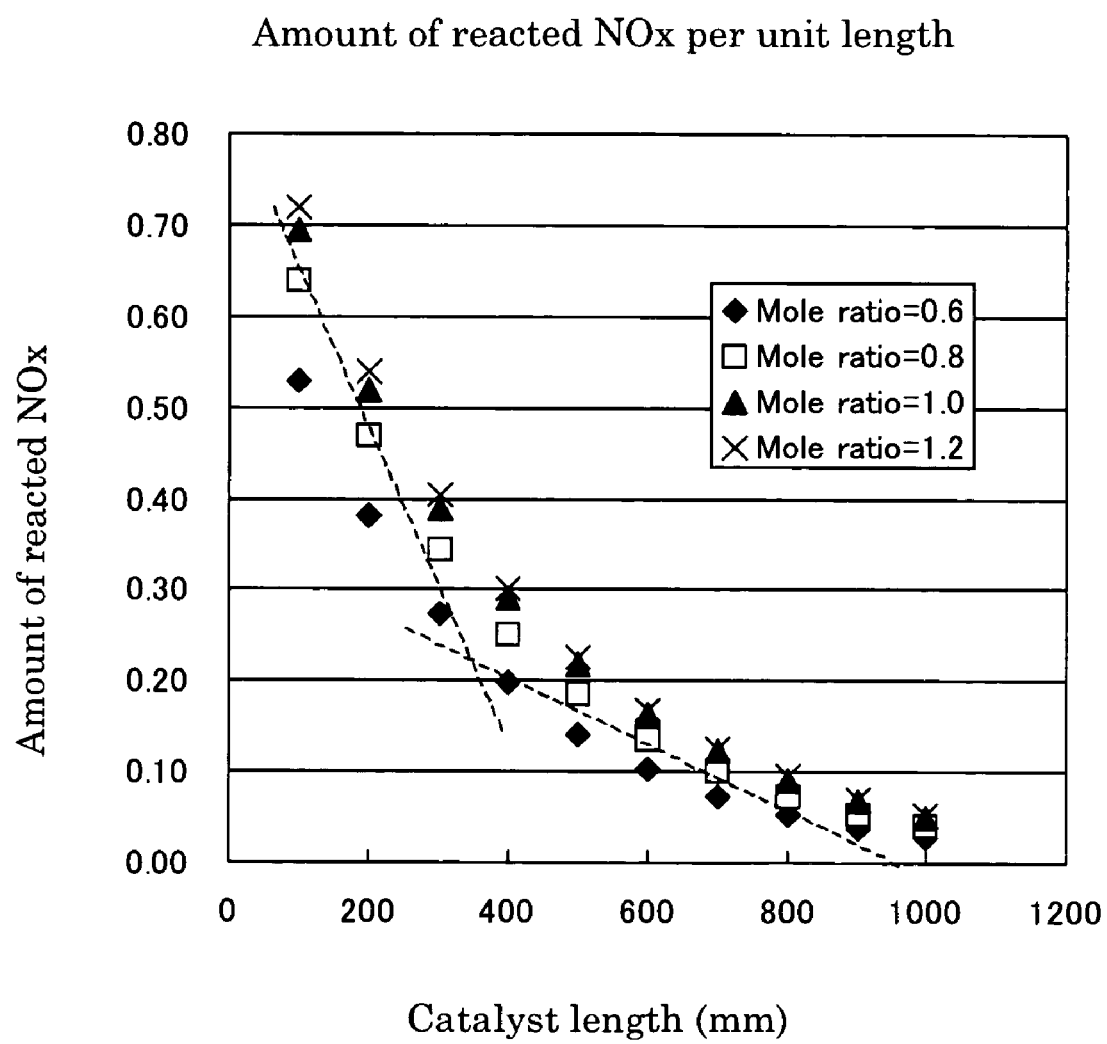
FIG. 10 is a graph showing the results of Test Example 5 of the present invention.

Amount of reacted $NO_x$ per unit length of comparative test pieces was determined at mole ratios of 0.6, 0.8, 1.0, and 1.2. The measurement was performed at points along the longitudinal direction with intervals of 100 mm. Table 3 and FIG. 10 show the results. The data determined at the points of 600 mm or longer were calculated from the data published by the catalyst manufacturer.

As is clear from FIG. 10, two approximated lines cross at a point within a catalyst length range of 300 mm to 400 mm. Therefore, gas diffusion and $NH_3$ adsorption are considered to simultaneously occur approximately within this range. FIG. 10 also shows that amount of reacted $NO_x$ drastically decreases in the range of the catalyst 400 mm or longer. Therefore, only gas diffusion is considered to occur in this range.

INDUSTRIAL APPLICABILITY

The present invention can be applied to any catalysts having a honeycomb structure through which reactive fluid passes, particularly in the case in which the reactive fluid contains a substance which inhibits catalytic reaction.

The invention claimed is:

1. A method for recovering performance of a discharge gas processing apparatus, which apparatus includes a honeycomb catalyst having gas conduits for feeding a gas to be treated, the catalyst being provided in a discharge gas conduit of the apparatus and, in use, performing gas treatment on the sidewalls of the gas conduits, characterized in that the honeycomb catalyst is in the form of a single layer of a flue gas $NO_x$ removal catalyst, and that the method comprises rearranging the honeycomb catalyst for recovering performance thereof such that a deteriorated portion of the honeycomb catalyst is transferred from the inlet side of the discharge gas conduit so that a predetermined range of the discharge gas conduit from the inlet side represents a portion other than the deteriorated portion, wherein the deteriorated portion is on the upstream side in terms of the flow of the gas to be treated, extends to cover the predetermined range of the honeycomb catalyst, and is determined on the basis of a sustained turbulent flow distance which is the distance from the inlet to a site where turbulent flow energy is lost in the course of transition from turbulent flow to laminar flow.

2. A method for recovering performance of a discharge gas processing apparatus according to claim 1, wherein the honeycomb catalyst is rearranged after the deteriorated portion has been removed.

3. A method for recovering performance of a discharge gas processing apparatus according to claim 1, wherein a portion of the sidewalls of the gas conduits of the honeycomb catalyst is removed through abrasion, the portion covering the deteriorated portion, and then the honeycomb catalyst is rearranged.

4. A method for recovering performance of a discharge gas processing apparatus according to claim 1, wherein the honeycomb catalyst is immersed at ambient temperature in regeneration water containing substantially no chlorine and no cleaning component, the catalyst is retransferred from the regeneration water, and residual water is retransferred from the catalyst.

5. A method for recovering performance of a discharge gas processing apparatus according to claim 1, wherein the honeycomb catalyst is rearranged such that the gas feed direction is inverted and the deteriorated portion is disposed on the downstream side in terms of the flow of the gas.

6. A method for recovering performance of a discharge gas processing apparatus according to claim 5, wherein the hon-

TABLE 3

| | Mole ratio | | | | | | | | | |
|---|---|---|---|---|---|---|---|---|---|---|
| | 100 | 200 | 300 | 400 | 500 | 600 | 700 | 800 | 900 | 1000 |
| 0.6 | 0.53 | 0.38 | 0.27 | 0.20 | 0.14 | 0.10 | 0.07 | 0.05 | 0.04 | 0.03 |
| 0.8 | 0.64 | 0.47 | 0.34 | 0.25 | 0.18 | 0.14 | 0.10 | 0.07 | 0.05 | 0.04 |
| 1.0 | 0.70 | 0.52 | 0.39 | 0.29 | 0.22 | 0.16 | 0.12 | 0.09 | 0.07 | 0.05 |
| 1.2 | 0.72 | 0.54 | 0.40 | 0.30 | 0.23 | 0.17 | 0.13 | 0.09 | 0.07 | 0.05 | eycomb catalyst is immersed at ambient temperature in regeneration water containing substantially no chlorine and no cleaning component, the catalyst is retransferred from the regeneration water, and residual water is retransferred from the catalyst.

7. A method for recovering performance of a discharge gas processing apparatus according to claim 5, wherein the predetermined range corresponds to a range from the inlet to a site where the flow of the gas fed into the gas conduits is regulated and straightened, and the predetermined range Lb is determined on the basis of the equation: Lb=a·Lt (wherein Lt represents the sustained turbulent flow distance and a is a constant).

8. A method for recovering performance of a discharge gas processing apparatus according to claim 7, wherein the range Lb (mm) is represented by equation (A):

$$Lb = a(Ly/Lys \cdot 22 e^{0.035(LY \cdot Uin)}) \quad (A)$$

(wherein Uin (m/s) represents a gas inflow rate, Ly (mm) represents an aperture size, Lys is an aperture size of 6 mm (constant value), and "a" is a constant falling within a range of 3 to 5, when the aperture size (Ly) is 6 mm and the gas inflow rate is 6 m/s).

9. A method for recovering performance of a discharge gas processing apparatus according claim 7, wherein the honeycomb catalyst is immersed at ambient temperature in regeneration water containing substantially no chlorine and no cleaning component, the catalyst is retransferred from the regeneration water, and residual water is retransferred from the catalyst.

10. A method for recovering performance of a discharge gas processing apparatus according to claim 1, wherein the honeycomb catalyst is cut perpendicular to the gas flow direction into a plurality of catalyst pieces, and the catalyst pieces are rearranged such that the deteriorated portion is not disposed on at least the furthest upstream side.

11. A method for recovering performance of a discharge gas processing apparatus according to claim 10, wherein the honeycomb catalyst is immersed at ambient temperature in regeneration water containing substantially no chlorine and no cleaning component, the catalyst is retransferred from the regeneration water, and residual water is retransferred from the catalyst.

12. A method for recovering performance of a discharge gas processing apparatus according to claim 10, wherein the predetermined range corresponds to a range from the inlet to a site where the flow of the gas fed into the gas conduits is regulated and straightened, and the predetermined range Lb is determined on the basis of the equation: Lb=a·Lt (wherein Lt represents the sustained turbulent flow distance and a is a constant).

13. A method for recovering performance of a discharge gas processing apparatus according to claim 12, wherein the range Lb (mm) is represented by equation (A):

$$Lb = a(Ly/Lys \cdot 22 e^{0.035(LY \cdot Uin)}) \quad (A)$$

(wherein Uin (m/s) represents a gas inflow rate, Ly (mm) represents an aperture size, Lys is an aperture size of 6 mm (constant value), and "a" is a constant falling within a range of 3 to 5, when the aperture size (Ly) is 6 mm and the gas inflow rate is 6 m/s).

14. A method for recovering performance of a discharge gas processing apparatus according claim 12, wherein the honeycomb catalyst is immersed at ambient temperature in regeneration water containing substantially no chlorine and no cleaning component, the catalyst is retransferred from the regeneration water, and residual water is retransferred from the catalyst.

15. A method for recovering performance of a discharge gas processing apparatus according to claim 1, wherein the predetermined range corresponds to a range from the inlet to a site where the flow of the gas fed into the gas conduits is regulated and straightened, and the predetermined range Lb is determined on the basis of the equation: Lb=a·Lt (wherein Lt represents the sustained turbulent flow distance and a is a constant).

16. A method for recovering performance of a discharge gas processing apparatus according to claim 15, wherein the honeycomb catalyst is immersed at ambient temperature in regeneration water containing substantially no chlorine and no cleaning component, the catalyst is retransferred from the regeneration water, and residual water is retransferred from the catalyst.

17. A method for recovering performance of a discharge gas processing apparatus according to claim 15, wherein the range Lb (mm) is represented by equation (A):

$$Lb = a(Ly/Lys \cdot 22 e^{0.035(LY \cdot Uin)}) \quad (A)$$

(wherein Uin(m/s) represents a gas inflow rate, Ly (mm) represents an aperture size, Lys is an aperture size of 6 mm (constant value), and "a" is a constant falling within a range of 3 to 5, when the aperture size (Ly) is 6 mm and the gas inflow rate is 6 m/s).

18. A method for recovering performance of a discharge gas processing apparatus according to claim 17, wherein the honeycomb catalyst is immersed at ambient temperature in regeneration water containing substantially no chlorine and no cleaning component, the catalyst is retransferred from the regeneration water, and residual water is retransferred from the catalyst.

* * * * *